Nov. 22, 1927.                                                                  1,650,310
U. A. WHITAKER
LOCOMOTIVE BRAKE EQUIPMENT
Filed Feb. 16, 1927                    2 Sheets-Sheet 1

Fig.1.

INVENTOR
UNCAS A. WHITAKER
BY *Wm. M. Cady*
ATTORNEY

Nov. 22, 1927.
U. A. WHITAKER
1,650,310
LOCOMOTIVE BRAKE EQUIPMENT
Filed Feb. 16, 1927    2 Sheets-Sheet 2
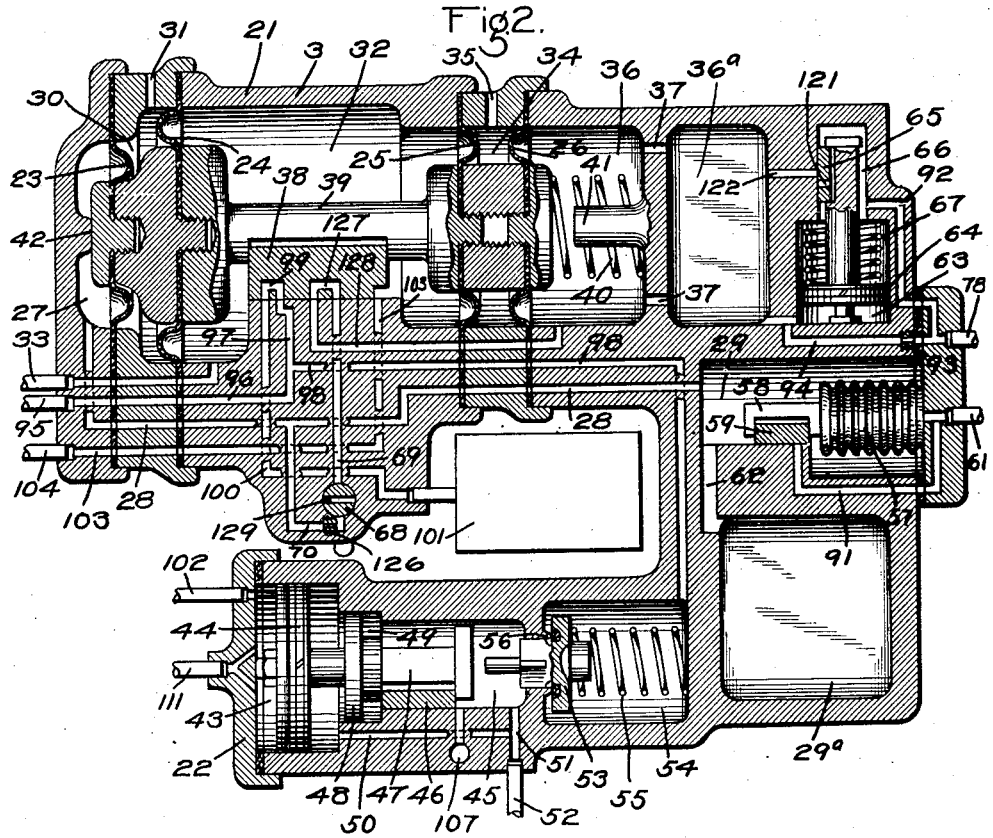
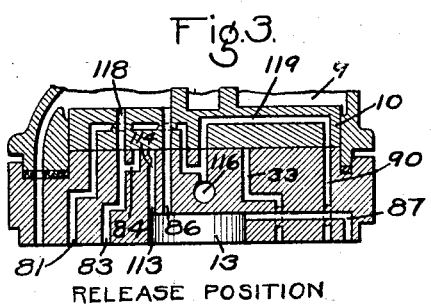
RELEASE POSITION
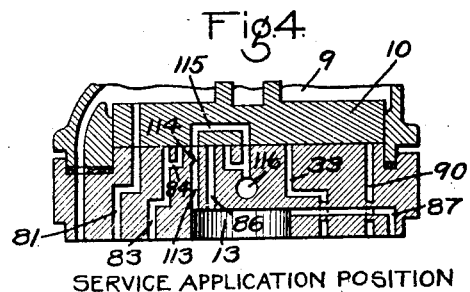
SERVICE APPLICATION POSITION
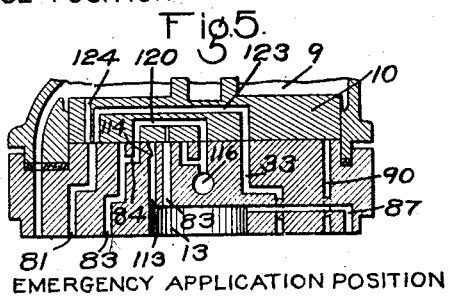
EMERGENCY APPLICATION POSITION
INVENTOR
UNCAS A. WHITAKER
BY *Wm. M. Cady*
ATTORNEY Patented Nov. 22, 1927.

1,650,310

UNITED STATES PATENT OFFICE.

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE EQUIPMENT.

Application filed February 16, 1927. Serial No. 168,590.

This invention relates to fluid pressure brakes and more particularly to a locomotive brake equipment.

In the usual fluid pressure locomotive brake equipment, a distributing valve device is employed having an application portion for controlling the supply and release of fluid under pressure to and from the brake cylinder, and an equalizing portion operated by variations in brake pipe pressure for controlling the operation of the application portion.

When the equalizing portion is in lap position, after effecting a service application of the brakes, if leakage of fluid under pressure, acting on the application piston of the application portion, should occur, the locomotive brake will tend to release, when not desired.

In graduating the release of brakes on the train, the brake pipe pressure is increased gradually in the usual manner, to cause movement of the triple valve device to release position, and then the brake valve device is moved to lap position. On cars equipped with means for graduating the release of the brakes, the brake cylinder pressure is reduced to a degree proportional to the degree of increase in brake pipe pressure, but on the locomotive, the equalizing portion of the distributing valve device is shifted to release position by the gradual increase in brake pipe pressure and remains there, so that the application cylinder is connected through the equalizing slide valves to the usual release pipe and thence to the atmosphere in the running position of the usual automatic brake valve device. When the brake valve device is moved to lap position, the release of fluid under pressure from the application cylinder and thence to the brake cylinder, is cut off, so that the rate of release of fluid under pressure from the locomotive brake cylinder does not correspond with the rate of increase in the brake pipe pressure, and consequently will not correspond with the rate at which the brakes are released on cars equipped with means for graduating the release of the brakes.

One object of my invention is to provide an improved locomotive fluid pressure brake equipment, in which the pressure in the application cylinder will be maintained against leakage, when the brake valve device is in lap position, after having made a service application of the brakes.

Another object of my invention is to provide an improved locomotive fluid pressure brake equipment in which graduated release of the brakes will be effected at a rate corresponding with the rate of increase in brake pipe pressure.

Other objects and advantages will appear in the following more detailed description of my invention.

In the accompanying drawings; Fig. 1 is a diagrammatic view, partly in section, of a locomotive fluid pressure brake equipment embodying my invention; Fig. 2 a sectional view of the distributing valve device employed in the construction shown in Fig. 1; Fig. 3 is a partial section of the automatic brake valve device, showing the rotary valve in release position; Fig. 4 is a partial section of the automatic brake valve device, showing the rotary valve in service application position; and Fig. 5 is a partial section of the automatic brake valve device, showing the rotary valve in emergency position.

As shown in the drawings, this improved locomotive brake equipment may comprise an automatic brake valve device 1, an independent brake valve device 2, a distributing valve device 3, a change-over valve device 4, the usual feed valve device 5, a reducing valve device 6, a main reservoir 7, and a locomotive brake cylinder 8.

The automatic brake valve device 1 comprises a casing having a chamber 9 containing a rotary valve 10, adapted to be operated by a handle 11. Said casing also contains the usual equalizing piston 12, forming a chamber 13 at one side, connected to the equalizing reservoir 14 and a chamber 15, at the opposite side, connected to the brake pipe 16, said piston being adapted to operate a discharge valve 17 for venting fluid under pressure from the brake pipe 16 to the atmosphere.

The independent brake valve device 2 comprises a casing having a chamber 18, containing a rotary valve 19, adapted to be operated by a handle 20.

The distributing valve device 3 comprises an equalizing portion 21 and an application portion 22. The equalizing portion 21 comprises four diaphragm heads 23, 24, 25, and 26, connected together by a stem 39. The chamber 27 at the outer face of diaphragm 23 is connected through a passage 28 with a control chamber 29, the volume of which is increased by the addition of a chamber 29ª, which is connected to chamber 29 through passage 62. The chamber 30, intermediate the diaphragms 23 and 24, is open to the atmosphere through a port 31. The chamber 32, intermediate the diaphragms 24 and 25, is in constant communication with the usual application cylinder pipe 33. The chamber 34, intermediate the diaphragms 25 and 26, is open to the atmosphere through a port 35, and chamber 36 at the outer face of diaphragm 26 is connected to a volume chamber 36ª through a plurality of ports 37, the chamber 36ª being connected to the brake pipe 16 through passage 94 and pipe 78. Movable with the stem 39 is a slide valve 38.

A coil compression spring 40 is contained in chamber 36 and acts on the outer end of stem 39, and extending from the partition wall separating the chambers 36 and 36ª is a stop 41 adapted to engage the end of the stem 39 and limit the movement thereof to the right. Normally, the spring 40 holds the stem 39 and the diaphragm heads in the left hand position, as shown in the drawings, in which the opposite end of the stem 39 engages the centrally located stop lug 42.

The application portion 22 comprises a casing having a piston chamber 43 containing an application piston 44 and a valve chamber 45 containing an exhaust slide valve 46, adapted to be operated by a stem 47 secured to the piston 44. On the stem 47, intermediate the piston 44 and slide valve 46, is a small piston 48 contained in chamber 49, and the chamber formed between said pistons is connected by passage 50 to passage 51, which leads to a pipe 52, connected to the brake cylinder 8.

Upon a predetermined inward movement of the application piston 44, the stem 47 is adapted to engage and operate a poppet valve 53 contained in chamber 54. The poppet valve is acted upon by a spring 55, adapted to normally hold said valve seated against the seat ring 56.

The application piston chamber 43 is connected by a pipe 111 to a safety valve 112, adapted to limit the pressure build-up in said chamber.

Contained in chamber 29 of the distributing valve device, is a charging valve device which comprises a flexible bellows diaphragm 57, having secured thereto a stem 58 adapted to operate a slide valve 59. The chamber within said diaphragm is connected through a pipe 61 with a protection reservoir 60, so that movement of the diaphragm is dependent upon the opposing pressures in chamber 29 and in the chamber within the diaphragm.

Also contained in the casing of the distributing valve device is a piston chamber 63, containing an emergency piston 64, adapted to operate a slide valve 65, contained in the valve chamber 66, and held in its normal position, as shown in the drawings, by the pressure of a coil spring 67.

A plug valve 68 controls communication between passages 69 and 70, so that communication between said passages may be either opened or closed.

The change-over valve device 4 comprises a casing containing a plug valve 71, adapted to be operated by a handle 72. The plug valve has a cavity 73, adapted in one position of the valve to connect pipe 74, from the protection reservoir 60, to pipe 77 through a passage 75 containing a choke plug 76. In another position of the valve 71, the cavity 73 connects pipe 78 and the brake pipe 16 to pipe 74 leading to the protection reservoir 60.

In operation, fluid from the main reservoir 7 is supplied through pipe 79 to the usual feed valve device 5, from which fluid at a reduced pressure is supplied through pipe 80 to the automatic brake valve device. With the brake valve in running position, as shown in Fig. 1, fluid at the reduced feed valve pressure then flows through pipe 80, passage 21 in the automatic brake valve device 1, cavity 82 in the rotary valve 10, passages 83 and 84, port 85 in the rotary valve, and passage 86, to the equalizing piston chamber 13 and thence through passage 87 to the equalizing reservoir 14. Fluid at feed valve pressure is also supplied from passage 83 to the brake pipe 16 and through passage 88 to the equalizing piston chamber 15. The pressure being thus equalized on opposite sides of the equalizing piston 12, the discharge valve 17 is held seated, as shown in the drawing.

Fluid at feed valve pressure is supplied from passage 84 in the automatic brake valve device to port 89 in the rotary valve 10, and thence through passage 90, pipe 77, choke plug 76 in the change-over valve device 4, passage 75, cavity 73 in the plug valve 71, and pipe 74 to the protection reservoir 60, and from pipe 74 through pipe 61 to the chamber within the bellows diaphragm 57. In initially charging the equipment, there being no fluid under pressure in valve chamber 29, the pressure of fluid within the bellows diaphragm 57 shifts the slide valve 59 to the left and uncovers the passage 91 connected to the pipe 61. Fluid at feed valve pressure from pipe 61 is thus permitted to flow to the valve chamber 29, the chamber 29ª, and through passage 28 to the diaphragm chamber 27.

The protection reservoir 60 is charged, as above described, with fluid under pressure, to the adjustment of the feed valve device 5, and when the chambers 29, 29ª, and 27 are charged to substantially feed valve pressure, the balancing of pressures on the bellows diaphragm 57 causes said diaphragm to collapse and shift the slide valve 59 to the right, so as to lap the passage 91.

Fluid under pressure from the brake pipe 16 is supplied through pipe 78 and passage 92 to the emergency valve chamber 66, and also from pipe 78 through the choke plug 93 and passage 94 to the chamber 36ª and through ports 37 to the chamber 36.

The brake pipe pressure in chamber 36 being the same as the feed valve pressure in diaphragm chamber 27, and with the pressures equalized in these chambers, the diaphragm heads 23, 24, 25, and 26, and the slide valve 38, are held in the release position against the diaphragm stop 42, as shown in the drawings. Fluid at brake pipe pressure from passage 94 also flows into the emergency piston chamber 63. The pressures being equal on opposite sides of said piston, the pressure of the spring 67 holds the piston and slide valve 65 in the position shown in the drawings.

Fluid at main reservoir pressure from pipe 79 is supplied through pipe 95 and passages 96, 97, and 98 in the distributing valve device, to poppet valve chamber 54, and from passage 97 through cavity 99 in the equalizing slide valve 38 and passage 100 to the application reservoir 101, charging the valve chamber 54 and the reservoir 101 with fluid under pressure.

With the automatic brake valve device 1 and independent brake valve device 2 in running position, the application piston chamber 43 of the distributing valve device is vented to the atmosphere through pipe 102, the application cylinder pipe 33, the equalizing valve chamber 32, passage 103, the release pipe 104, cavity 105 in the rotary valve 19 of the independent brake valve device 2, and the atmospheric exhaust passage 106.

With the application cylinder 43 vented to the atmosphere, the application piston 44 and exhaust valve 46 will be held in the release position, as shown in the drawings, in which the brake cylinder 8 is connected to the atmosphere through pipe 52, valve chamber 45 and the exhaust passage 107.

The usual application cylinder pipe 33 is connected to the rotary valve seat of both brake valve devices and is lapped in each, when in running position.

Fluid under pressure from the main reservoir 7 is supplied through pipe 108 to the usual reducing valve device 6, which operates to supply fluid at the reduced pressure usually employed for independent control of the locomotive brakes, through pipe 109 and port 110 in the rotary valve 19 to the rotary valve chamber 18 of the independent brake valve device.

To effect a service application of the brakes, the automatic brake valve device is moved to service application position, as shown in Fig. 4, in which the passage 83 connected to the brake pipe 16 is lapped by the rotary valve, and fluid under pressure from the equalizing reservoir 14 and the equalizing piston chamber 13 is vented to the atmosphere through passage 113, containing a restricted portion 114, cavity 115 in the rotary valve 10 and to the atmosphere through the exhaust passage 116. When the desired reduction in the equalizing reservoir pressure has been effected, the brake valve device is moved to lap position, in which no connections are made through the rotary valve 10, and the connection of the equalizing reservoir 14 and equalizing piston chamber 13 to the atmosphere is thus lapped.

The reduction in pressure in the equalizing piston chamber 13 permits the opposing brake pipe pressure in chamber 15 to shift the equalizing piston 12 upwardly and thereby open the discharge valve 17 which permits the flow of fluid under pressure from chamber 15 and the brake pipe 16 to the atmosphere. When the brake pipe pressure and the pressure in chamber 15 becomes reduced to a degree slightly less than the equalizing reservoir pressure in chamber 13, the equalizing piston 12 is shifted downwardly and closes the discharge valve 17 and prevents a further reduction in the pressure of the brake pipe fluid.

Chambers 36ª and 36 in the distributing valve device 2 being connected to the brake pipe 16 through passage 94, choke plug 93, and pipe 78, the pressure of the fluid in said chambers reduces with the brake pipe pressure.

The pressure of the fluid in the diaphragm chamber 27 and the control chambers 29 and 29ª, remaining constant during a service application of the brakes on account of being bottled up, the diaphragm heads 23, 24, 25, and 26 are shifted to the right against the reduced pressure of the brake pipe fluid in the chamber 36 and against the pressure of the spring 40, to service position. The slide valve 38 is shifted by said diaphragm heads to service position, in which position passage 103, connected to the usual release pipe 104, is lapped, and passage 100 from the application reservoir 101 is connected to the chamber 32. Fluid under pressure from the application reservoir 101 then flows into chamber 32 and through pipes 33 and 102 to the application piston chamber 43, wherein said pressure acts on the piston 44 and causes it to move to the right. The initial movement shifts the slide valve 46 and laps the atmospheric exhaust port 107, after which the piston stem 47 engages the stem of the poppet valve 53 and shifts said valve to the right, in which position fluid at main reservoir pressure from chamber 54 is permitted to flow past the valve to slide valve chamber 45, and thence through passage 51 and pipe 52 to the locomotive brake cylinder 8, thereby applying the brakes.

When the pressure of fluid in the application chamber 32 has been increased to a degree such that the increased pressure acting on the differential area of diphragm 24 with respect to diaphragm 25, is sufficient to overcome the effect of reducing the brake pipe pressure in chamber 36, the diaphragm heads will be shifted to the left and the slide valve 38 is thereby moved to lap position, in which the passage 100 from the application reservoir is lapped, thereby preventing a further increase of pressure in chambers 32 and 43. In lap position, the slide valve 38 continues to cover the release pipe passage 103, so that fluid will not be vented through said pipe in lap position.

Fluid at the pressure supplied to the brake cylinder also flows through passage 50 to the chamber between pistons 44 and 48, and when the brake cylinder pressure becomes silghtly greater than the pressure in the application cylinder 43, the application piston 44 is shifted to lap position, in which position the poppet valve 53 is permitted to close and prevent a further flow of fluid under pressure from the main reservoir to the brake cylinder.

If a higher brake cylinder pressure is desired, a further reduction in brake pipe pressure may be effected, which will cause the equalizing and application portions of the distributing valve device to operate, in the same manner as hereinbefore described, to increase the brake cylinder pressure. Then the brake cylinder pressure can be applied in steps as desired.

If, for any reason, the pressure in the diaphragm chamber 32 and in the application piston chamber 43 tends to become reduced, as by leakage, so as to tend to cause the application piston 44 and exhaust slide valve 46 to be shifted to release position and thus cause a release of the brakes, the equilibrium of fluid pressures on the diaphragm heads in lap position will be destroyed, and consequently the control pressure in diaphragm chamber 27 will shift said heads and the slide valve 38 to service position, in which fluid under pressure from the application reservoir 101 is permitted to flow into the chambers 32 and 43 and restore the pressure in said chambers to the original degree. The diaphragm heads are then shifted so as to move the slide valve 38 back to lap position. The operation of the distributing valve device will thus maintain the application cylinder pressure, and consequently the brake cylinder pressure, up to the capacity of the application reservoir 101.

To release the locomotive brakes after a service application of the brakes, the brake valve device 1 may be returned to running position, in which the brake pipe pressure and the pressure in chambers 36 and 36ª of the distributing valve device is increased. The increase in pressure in chamber 36 destroys the equilibrium of the diaphragm heads and shifts said heads, against the application cylinder pressure in diaphragm chamber 32 and control reservoir pressure in diaphragm chamber 27, to release position in which the stem 39 strikes the stop 42. The slide valve 38 is shifted to release position, as shown in the drawings, in which the fluid under pressure in the application cylinder 43 and diaphragm chamber 32 is vented to the atmosphere through passage 103 and the release pipe 104, as hereinbefore explained. Venting of fluid under pressure from the application piston chamber 43 permits the higher brake cylinder pressure acting on the opposite side of the application piston 44 to shift said piston and the slide valve 46 to release position, in which fluid under pressure is vented from the brake cylinder 8 through pipe 52, passage 51, valve chamber 45, and the atmospheric exhaust passage 107.

If it is desired to graduate the release of the brakes, the fluid under pressure in the brake pipe is only partially restored, and the automatic brake valve device 1 is then moved to lap position. The increase in brake pipe pressure and pressure in chamber 36 of the distributing valve device operates, as above described, to shift the equalizing portion of the distributing valve device to release position, in which the pressure in the application cylinder 43 and the brake cylinder 8 is reduced. When the application cylinder pressure and the pressure in the diaphragm chamber 32 become reduced to a degree corresponding with the increase in brake pipe pressure, the forces acting on the diaphragm heads 23, 24, 25, and 26, operate the heads to shift the slide valve 38 back to lap position, in which a further decrease in application cylinder pressure is prevented. Then when the brake cylinder pressure becomes reduced to a degree slightly less than the application cylinder pressure, acting in chamber 43, the application piston and slide valve are shifted back to lap position, in which the atmospheric exhaust passage 107 is lapped and prevents a further decrease in brake cylinder pressure.

The brake pipe pressure may thus be restored in steps as desired, and the distributing valve device will be operated by the increased brake pipe pressure to permit a proportional and graduated release of fluid under pressure from the locomotive brake cylinder.

It is common practice, especially on long trains and where a quick release of the brakes is desired, to initially move the automatic brake valve to release position, as shown in Fig. 3, in which position fluid at main reservoir pressure from chamber 9, supplied thereto through pipe 117, from the main reservoir pipe 79, is permitted to flow directly into the brake pipe 16 by way of port 118 in the rotary valve 10 and passage 83. This builds up a high pressure head in the brake pipe at the front end of the train and increases the brake pipe pressure at the rear of the train at a faster rate and consequently produces a quicker release of the brakes.

The length of time the brake valve device is held in release position is limited so as to prevent overcharge of the auxiliary reservoirs on the cars at the head of the train. The brake valve is then moved from release position to running position, in which the high head of pressure in the brake pipe at the head of the train reduces, by flow to the rear of the train, to the pressure at which the feed valve device is adjusted, the feed valve then controlling the remainder of the brake pipe charging.

To prevent overcharging of the control chambers 29 and 29ª, when the brake valve device is in release position, the pipe 61 and the protection reservoir 60 are connected to the atmosphere through pipe 74, cavity 73 in the plug valve 71, passage 75, choke plug 76, pipe 77, passage 90 in the automatic brake valve device 1, cavity 119 in the rotary valve 10 and the atmospheric exhaust passage 116. The pressure in the protection reservoir is thus reduced, so that when the automatic brake valve device is turned from release to running position, the connection of the brake pipe, with its momentary high head of pressure, to the protection reservoir through the controlling choke plug 76 in the change-over valve device 4, will not cause a build-up of pressure in the protection reservoir higher than the adjustment of the feed valve device, before the high pressure head is reduced by equalizing to the rear of the train. By preventing the protection reservoir from becoming overcharged, the pressure of the fluid in the control chambers 29 and 29ª will never exceed the pressure due to the adjustment of the feed valve device 5, and furthermore prevents an undesired application of the locomotive brakes, such as would occur if the pressure in the diaphragm control chamber 27 should exceed the opposing full brake pipe pressure in diaphragm chamber 36.

To effect an emergency application of the brakes, the automatic brake valve device is moved to emergency position, as shown in Fig. 5, in which position the brake pipe 16 is suddenly vented directly to the atmosphere through passages 83 and 84, cavity 120 in the rotary valve 10 and through the atmospheric exhaust passage 116, thereby initiating a quick serial emergency action throughout the train, in the usual manner.

Choke 93 in the brake pipe passage 94 in the distributing valve device prevents a sudden emergency reduction in the pressure in chambers 36 and 36ª, but the brake pipe is connected through pipe 78 and passage 92 to the emergency valve chamber 66. The pressure in said chamber is thus suddenly reduced with brake pipe pressure, so that the higher pressure in piston chamber 63 is permitted to shift the piston 64 and slide valve 65 upward against the pressure of the spring 67 to a position in which port 121 through the slide valve registers with passage 122 from the chamber 36ª. The fluid under pressure in chambers 36ª and 36 is thus suddenly reduced by flow through the valve chamber 66, passage 92 and pipe 78 to the brake pipe 16, and thence to the atmosphere.

The sudden reduction of the pressure in chamber 36 permits the control chamber pressure in diaphragm chamber 27 to shift the diaphragm heads and slide valve 38 to emergency position against the stop 41, which corresponds with the service position. The fluid under pressure in the application reservoir 101 is then permitted to flow to the application cylinder 43 and operate the application piston to apply the locomotive brakes in the same manner as in service.

The pressure developed in the application piston chamber 43 tends to be high, due to the equalization of the fluid under pressure from the application reservoir into the application piston chamber 43, but to prevent an excessive pressure and consequently an excessive application of the brakes, the application piston chamber is connected through pipe 111 to a safety valve 112, which gradually blows down the pressure in the application chamber 43 and thus limits the application cylinder pressure to a safe maximum degree.

In order to prevent an undesired release of the brakes in the emergency application position, due to possible leakage of fluid under pressure from the application piston chamber to the atmosphere, the application cylinder pipe 33, which is connected to the application piston chamber through pipe 102, registers with cavity 123 in the rotary valve 10 of the automatic brake valve device, which cavity is connected through passage 81 and a restricted port 124 in the rotary valve 10 to the rotary valve chamber 9. Fluid at main reservoir pressure in chamber 9 is thus permitted to flow to the application piston chamber 43 and maintain the pressure therein at the degree as determined by the safety valve device 112.

To apply the locomotive brakes independently of the train brakes, the independent brake valve device is moved from running position, as shown in the drawings, to application position (not shown), in which fluid at reducing valve pressure in pipe 109 is permitted to flow to the application cylinder pipe 33 and through pipe 102 to the application piston chamber 48, and therein acts upon and operates the application piston 44 to apply the locomotive brakes, as hereinbefore described. Pipe 33 is also connected with diaphragm chamber 32, and the pressure of the fluid supplied thereto exerts an additional thrust to the left on the diaphragm heads, but this has no effect on the operation.

To release an application of the brakes, as effected by the independent brake valve device, the independent brake valve device is moved to running position, in which the application piston chamber 43 and diaphragm chamber 32 are connected to the atmosphere through the release pipe 104, or a quicker release of the application cylinder pressure may be effected by moving the independent brake valve device to release position (not shown) and connecting the application cylinder pipe 33 directly through a cavity in the rotary valve 19 to the atmospheric passage 125.

By using release position of the independent brake valve device 2 to vent the application cylinder pipe 33 to the atmosphere, an application of the brakes previously made with the automatic brake valve device may be released at any time, irrespective of the position of the automatic brake valve device. When effecting such a release, the brake valve should be held in release position long enough to permit the fluid under pressure in the application reservoir 101 to be vented to the atmosphere, since the diaphragm heads would otherwise shift the slide valve 38 to service position in an endeavor to maintain the application cylinder pressure.

Usually, the pressure in the brake pipe is maintained at the pressure at which the feed valve device is adjusted, but when operating a train down a grade, the brake valve device may be placed in full release position, and the brake pipe pressure employed under such circumstances is the pressure of the fluid in the main reservoir.

Under such conditions, the change-over valve 4 is turned, so that cavity 73 in the plug valve 71 connects pipe 78 from the brake pipe 16 to pipe 74 connected to the protection reservoir 60, so that said reservoir is charged directly from the brake pipe.

The reservoir 60 is thus charged directly from the brake pipe instead of by way of ports in the automatic brake valve device, for the reason that, as hereinbefore described, in the release position of the brake valve device, the pipe 77 is connected through cavity 119 in the rotary valve 10 with the exhaust port 116, and consequently, when the brake valve device is maintained in release position, instead of running position, the protection reservoir 60 would not be maintained charged with fluid under pressure.

If it is desired to cut out the graduated release feature, the plug valve 68 in the distributing valve device 3 is turned, so that port 129 connects passage 70 to passage 69. Then, in graduating the release on the train, when the diaphragm heads and slide valve 38 are shifted to release position by an increase in brake pipe pressure, effective in chamber 36, cavity 127 in the slide valve 38 will connect the control chamber 29 and diaphragm chamber 27 through passages 28 and 70, choke plug 126, port 129 in the plug valve 68 and passage 69 to passage 128 and chamber 36, and consequently to the brake pipe 16. The fluid under pressure in the diaphragm chamber 27 and control chamber 29 thus equalize with the fluid under pressure in the brake pipe 16, so that even though the brake pipe is only partially recharged, there is no higher pressure on diaphragm head 23 to shift the diaphragm heads and slide valve to lap position, so as to cut off the application cylinder connection to the release pipe, and as a result a full and direct release of the brakes will result.

The choke plug 126 is provided in passage 70 so that when a service rate of reduction in the pressure in the diaphragm chamber 36 is made to apply the brakes, the back flow of fluid under pressure from diaphragm chamber 27 will be so restricted as to prevent a sufficient decrease in the pressure in chamber 27 as to cause a failure to obtain a brake application.

The choke plug 93 in passage 94 connecting chamber 36ª to pipe 78 and the brake pipe 16 is provided to cause a slight lag in the change in pressure in chamber 36ª as compared to variations in pressure in the brake pipe 16, so as to more nearly synchronize the operation of the equalizing portion of the distributing valve device with the valve devices on the cars in a train, and for this reason it is necessary to employ the emergency piston 64 and slide valve 65, the operation of which was described in connection with securing an emergency application of the brakes.

With the usual fluid pressure brake equipment, approximately a 4½ pound reduction in auxiliary reservoir pressure is required to shift the brake cylinder piston from its release position to its applied position, while with a distributing valve device of my improved construction, when the brake cylinder pressure is controlled directly by the brake pipe pressure, a 4½ pound brake pipe reduction would tend to produce about 15 pounds brake cylinder pressure. To make this distributing valve device operate simultaneously with the usual brake equipments, the spring 40 is provided, acting on the diaphragm head 26, and is adapted to prevent the initial 4½ pounds reduction in brake pipe pressure from moving the diaphragm heads and slide valve 38 to service position. Further brake pipe reduction will, however, produce the same locomotive brake cylinder pressure as obtained on the cars in the train.

If when effecting a service application of the brakes, the pressure in the application piston chamber 43 should tend to build up undesirably, the safety valve 112 will prevent an excessive pressure from being developed.

Having now described my invention, what I claim as new and desire to secure by Letters Patent, is:—

1. In a fluid pressure brake, the combination with a brake pipe and brake cylinder, of means subject to the opposing pressures of the brake pipe and a chamber for controlling the fluid pressure in said chamber, and means subject to the opposing pressures of said chamber and the brake cylinder for controlling the fluid pressure in the brake cylinder.

2. In a fluid pressure brake, the combination with a brake pipe and brake cylinder, of movable abutments subject to the opposing pressures of the brake pipe and a chamber, valve means operated by said abutment for controlling the fluid pressure in said chamber, a movable abutment subject to the opposing pressures of the brake cylinder and said chamber, and valve means operated by said abutment for controlling the fluid pressure in said brake cylinder.

3. In a fluid pressure brake, the combination with a brake pipe and brake cylinder, of movable abutments subject to the opposing pressures of the brake pipe and a chamber, a reservoir normally charged with fluid under pressure, valve means operated by said abutments upon a reduction in brake pipe pressure for supplying fluid from said reservoir to said chamber, and means subject to the opposing pressures of the brake cylinder and said chamber for controlling the fluid pressure in the brake cylinder.

4. In a fluid pressure brake, the combination with a brake pipe and brake cylinder, of movable abutments subject to the pressures of the brake pipe, a first chamber, and a second chamber, means for maintaining the pressure in the first chamber at a predetermined degree, independently of the brake pipe, valve means operated by said abutments for controlling the fluid pressure in the second chamber, and means controlled by the pressure in the second chamber for controlling the pressure in the brake cylinder.

5. In a fluid pressure brake, the combination with a brake pipe and brake cylinder, of movable abutments subject to the pressures of the brake pipe, a first chamber, and a second chamber, valve means operated by said abutments for controlling the fluid pressure in the second chamber, means controlled by the pressure in the second chamber for controlling the fluid pressure in the brake cylinder, a reservoir from which fluid is supplied to the first chamber, and a brake valve device having a running position in which fluid under pressure is supplied to the said reservoir, and a release position, in which fluid is vented from said reservoir.

6. In a fluid pressure brake, the combination with a brake pipe, of means subject to the opposing pressures of the brake pipe and a chamber for controlling the brakes, a reservoir from which fluid is supplied to said chamber, and a brake valve device having a running position in which fluid under pressure is supplied to said reservoir, and a release position in which fluid is vented from said reservoir.

7. In a fluid pressure brake, the combination with a brake pipe, of means subject to the opposing pressures of the brake pipe and a chamber for controlling the brakes, a source of fluid under pressure, a movable abutment subject to the opposing pressures of said chamber and said source, and valve means operated by said abutment for controlling the supply of fluid from said source to said chamber.

8. In a fluid pressure brake, the combination with a brake pipe, of means subject to the opposing pressures of the brake pipe and a chamber for controlling the brakes, a source of fluid under pressure, a movable abutment subject to the opposing pressures of said chamber and said source, and valve means operated by said abutment for controlling the supply of fluid from said source to said chamber, communication from said source to said chamber being closed upon equalization of fluid pressures on opposite sides of said abutment.

9. In a fluid pressure brake, the combination with a brake pipe, of means subject to the opposing pressures of two chambers, one of which is open to the brake pipe through a restricted port, for controlling the brakes, and means operated upon a sudden reduction in brake pipe pressure for connecting said brake pipe chamber to the brake pipe through a larger port.

10. In a fluid pressure brake, the combination with a brake pipe, of means subject to the opposing pressures of the brake pipe and a chamber for controlling the brakes, a reservoir adapted to be charged with fluid under pressure, and means subject to the opposing pressures of said chamber and said reservoir for controlling communication from said reservoir to said chamber.

11. In a fluid pressure brake, the combination with a brake pipe, of movable abutments subject to the pressures of the brake pipe, a first chamber, and a second chamber, valve means operated by said abutments for controlling the fluid pressure in the second chamber, means for normally maintaining the pressure in the first chamber, and normally operable means for controlling communication through which fluid under pressure is supplied to said first chamber.

12. In a fluid pressure brake, the combination with a brake pipe, of means subject to the opposing pressures of the brake pipe and a chamber for controlling the brakes, a reservoir, a brake valve device having a position for supplying fluid under pressure to said reservoir, and means subject to the opposing pressures of said reservoir and said chamber for controlling communication from said reservoir to said chamber.

13. In a fluid pressure brake, the combination with a brake pipe, of means subject to the opposing pressures of the brake pipe and a chamber for controlling the brakes, a reservoir from which fluid under pressure is supplied to said chamber, a brake valve device through which said reservoir is normally charged with fluid under pressure, and valve means operable to connect said reservoir directly to the brake pipe.

14. In a fluid pressure brake, the combination with a brake pipe, of means subject to the opposing pressures of the brake pipe and a chamber for controlling the brakes, a reservoir from which fluid under pressure is supplied to said chamber, a brake valve device through which said reservoir is normally charged with fluid under pressure, and valve means operable to connect said reservoir directly to the brake pipe, independently of said valve device.

15. In a fluid pressure brake, the combination with a brake pipe, of means subject to the opposing pressures of the brake pipe and a chamber for controlling the brakes, a reservoir from which fluid under pressure is supplied to said chamber, a brake valve device through which said reservoir is normally charged with fluid under pressure, and manually operable valve means adapted in one position to establish communication through which fluid under pressure is supplied from the brake valve device to said reservoir and in another position to connect the brake pipe directly to said reservoir.

In testimony whereof I have hereunto set my hand.

UNCAS A. WHITAKER.